WILLIAM B. HODGE.
AND
CULLEN L. LYTTON
INVENTORS.

ATTORNEY.

Aug. 20, 1935.  W. B. HODGE ET AL  2,011,763
APPARATUS FOR CLEANING MACHINES
Filed May 19, 1931  8 Sheets—Sheet 3

Fig-3

WILLIAM B. HODGE
AND
CULLEN L. LYTTON.
INVENTORS.

BY

ATTORNEY.

Aug. 20, 1935. W. B. HODGE ET AL 2,011,763
APPARATUS FOR CLEANING MACHINES
Filed May 19, 1931 8 Sheets-Sheet 4

Fig. 4

WILLIAM B. HODGE.
AND
CULLEN L. LYTTON.
INVENTORS.

BY
ATTORNEY.

Fig. 9

Aug. 20, 1935.        W. B. HODGE ET AL        2,011,763
APPARATUS FOR CLEANING MACHINES
Filed May 19, 1931        8 Sheets-Sheet 8

INVENTORS:
WILLIAM B. HODGE.
AND CULLEN L. LYTTON.
BY Paul B Eaton
ATTORNEY.

Patented Aug. 20, 1935

2,011,763

UNITED STATES PATENT OFFICE 2,011,763

APPARATUS FOR CLEANING MACHINES

William B. Hodge, Charlotte, and Cullen L. Lytton, Gastonia, N. C., assignors to Parks-Cramer Company, Fitchburg, Mass., a corporation of Massachusetts Application May 19, 1931, Serial No. 538,588

33 Claims. (Cl. 15—20)

This invention relates to methods and means for cleaning machinery of any type in which the exposed parts and surfaces of the machine and its structure and the material being processed thereon are subjected while in operation to accumulations of lint, dust or objectionable foreign matter deposited thereon.

The object of this invention is to provide machinery, more especially that used in textile mills, with a draft producing mechanism whereby from time to time a blast of air will be propelled across the surfaces of said machinery in several directions, thereby clearing those surfaces and parts of lint, fly, and accumulated dirt, blowing it to the floor and thereby eliminating to a great extent the use of manual labor therefor.

The invention is particularly adapted to ring spinning and ring twisting machinery of those types in which there are parallel rows of spindles on each side of the machine, and in which the material in process in the form of yarn or roving is carried on bobbins or spools, in creels running longitudinally over the central portion of the machine.

Of particular importance is the compactness and self-contained nature of the mechanism and its accessories, all of which may be supported immediately above the particular machine to be cleaned, regardless of its location with respect to adjacent machines, which amounts in fact to making the entire cleaning equipment self-contained upon the machine itself. The arrangement being such, however, that when several machines of this type are arranged longitudinally in rows the supporting track may be extended over a row of machines, in which case the traveler operates reciprocally back and forth from one end of the row to the other.

Another outstanding advantage of the device is the successful avoidance of interference with shafting, piping, electrical conductors and fixtures of like nature that are commonly supported from the ceiling of factories, and with belting extending from shafting overhead to machinery on the floor. Because of the compactness and small vertical height of the parts comprising the invention, such interference with consequent inconvenience and expense in installation is successfully avoided.

Another characteristic of the invention is the provision of separate blasts of air on each side of the machine and means for so guiding the blasts downwardly in divergent directions with respect to each other, and forwardly and rearwardly of the vertical axis of the blast delivery means, that the outer parts and surfaces of the machine are swept on either side in an outward direction by one section of the blast, while other sections of the blast pass inwardly across the central portions of the machine and whatever material may be thereon, but in such different directions with respect to each other that these blasts pass freely across the machine from opposite sides without opposing or interfering with each other.

It thus results that as the traveler moves back and forth reciprocally over the machine, the outer parts thereof are successively swept by currents that alternately approach from opposite directions, while the central portions and the materials thereon are swept twice in each traverse by blasts that are directed alternately from opposite sides with respect to each other, and that approach from one direction during one traverse and in the opposite direction during the next traverse.

The air current generated by a disc fan is characterized by a rotary as well as a longitudinal travelling motion, that may be described as a swirling motion. When the air issues from the fan box through the openings in the bottom, this swirling motion operates in a manner to sweep the horizontal surfaces of the upper and lower creel boards downwardly and forward on the left sweep, from left to right; while the blast on the right hand side goes downwardly and backwardly across the horizontal surfaces from right to left, so that after the roving, the bobbins, the creels and the horizontal surfaces have been swept in one direction by the forward blast, the following rearward blast sweeps the same objects and surfaces in the opposite direction. After the blast producing mechanism has completed its travel to the end of the track and reverses, the same operation is repeated, approaching the surfaces to be cleaned from the opposite direction.

The outer portion of each air blast actually passes downward along the outermost parts of the machine, removing the lint and fly from those sections and blowing them forwardly to the floor with appreciable force, and at the same time tending to roll this waste under the machine where it can do no harm, instead of impelling it toward adjoining machines, where it might be drawn into and damage the product of such machines.

The embodiment herein disclosed comprises a track mounted upon and longitudinally above a ring spinning machine and firmly secured to the structure of the machine itself. Mounted on the track is a motor propelled carriage with a vertically disposed shaft and a fan enclosed in a guard box, organized to travel back and forth upon the track over either a single machine or a row of machines, and directing separate blasts of air against and over the surfaces of the machine and over the material being processed thereon. Since the structure and running gear occupy so small a space above the machinery and are carried on the machinery itself, it becomes possible to manufacture the parts and assemble the equipment as a whole at the common point of manufacture, and so reduce the labor involved in installing the equipment in the factory to the lowest possible terms, thus favoring standardized manufacturing processes with corresponding minimum cost of manufacture and installation.

Some of the objects of the invention having been stated, other objects will appear more fully as the detailed description of the invention is more fully set forth in connection with the drawings, in which—

Referring more specifically to the drawings, the numerals 10 and 11 indicate portions of the spinning frames having the creel boards 12 and 12a on the upper portions thereof and this invention is adapted to be applied above the upper creel board 12. In supporting the mechanism there is provided a plurality of upstanding supports 13 which are secured at their lower ends to the upper side of the creel board 12, and suitable cross bars 14 are secured on the upper ends of the supports 13, and on these cross bars 14 are mounted the angular track members 15 and 16 which extend from one end of the machine to the other, and if desired over a plurality of machines.

Secured to the lower surface of the horizontally disposed portion of track member 16 is an approximately U-shaped member 17 which projects downwardly and inwardly. This member 17 is secured to track 16 by any suitable means such as screws 18. Disposed along the enclosed portion of member 17 are a plurality of insulating blocks 19, secured in any suitable manner such as by screws 20, and these blocks support a plurality of trolleys 21, 22 and 23 which trolleys are shown as being of a peculiar form in Figure 6. A portion of these trolleys project outwardly beyond the blocks and have a flattened outer surface against which a plurality of brushes such as 24, 25 and 26, mounted in an insulating block 27, are adapted to follow, these brushes being pressed against the trolleys by means of compression springs 28, 29 or 30, and communicating with the compression springs 28, 29 and 30 are the plates 31a, 32a and 33a which are fixedly secured to block 27.

These plates have contacts 31, 32 and 33 thereon and to which contacts insulated wires 34, 35 and 36 are secured, said wires forming a circuit to the motor.

Suitable electrical energy is supplied to the trolleys 21, 22 and 23, and of course, in case of direct current being used, only two trolleys would be necessary, but in the drawings, three trolleys are shown for use in connection with alternating three-phase current.

The wires 34, 35 and 36 are led through a conduit 37 which is secured as at 38 and 39 to a bracket 40 which bracket is secured to block member 34 as at 41 for supporting the same, and this bracket is secured at its upper end to the motor housing. The upper end of conduit 37 is secured to bracket 40 as at 43, and the wires enter hole 44 in box 45a, the wires leading into the motor housing.

The motor housing is indicated by reference character 45, and another housing 46 is secured to the lower end thereof by means of suitable screws penetrating holes 47 in housing 46. This housing 46 has spaced projections 48 and 49 projecting from the inner surface on one side thereof, and similar projections 50 and 51 project from the sidewall on the opposite side thereof, the projections 48 and 50 being in alinement and likewise projections 49 and 51 being in alinement.

Rotatably mounted in projections 50 and 51 is a shaft 52 on which is secured a worm gear 53, and slidably mounted on this shaft is a collar 54 which has a peripheral groove 55 therein. This collar is slidably mounted on a key way 56 on shaft 52. Loosely secured on shaft 52 is a collar 57 which is rotatably mounted in a suitable opening in the sidewall of housing 46, and a fibrous washer 58 is provided on the exterior thereof to prevent leakage of lubricant from the housing 46. Integral with collar 57 is the grooved portion 69 forming a wheel for traversing the rounded portion 16a of track 16, and in the collar 57 is resiliently mounted a pin 63 which is headed as at 64 to limit its outward movement, and a compression spring 65 normally presses the pin 63 to the position shown in Figure 6. A washer 66 is mounted on the outer end of shaft 52 and a nut 67 threadably engages the end of shaft 52 to confine spring 65 in position and to loosely secure collar and wheel 57 on said shaft as portion 68 is smaller than the key way portion so as to cause nut 67 to confine the collar and wheel 57 loosely on said shaft. Slidable collar 54 has a plurality of cavities 70 therein which are adapted to be engaged by pin 63 while the mechanism is travelling in one direction only, and to be held in the position shown in Figures 5 and 6 when travelling in the other direction.

Rotatably mounted in projections 48 and 49 is a shaft 75 which in all respects is identical to shaft 52, and on this shaft between projections 48 and 49 is fixedly secured a worm gear 76 which, like its similar gear 53, meshes with a worm 77 on motor shaft 78 which projects downwardly through the upper portion of housing 46 and is suitably mounted in a bearing portion 79. Shaft 75 has slidably mounted thereon collar 80 which collar has a peripheral groove 81 therein and receives a pin 82 engaging cavities identical to cavities 70 in wheel 54 while the mechanism is travelling in one direction, and it is shown engaged in Figure 5.

Collar and wheel 83 are loosely secured on shaft 75, and a washer 84 surrounds the same to prevent leakage of lubricant, and collar 83 has a grooved portion 85 on the exterior of the housing with a washer 86 identical to washer 66 secured thereon by means of nut 87 threadably engaging the end of shaft 75.

Projecting downwardly from the upper sidewall of housing 46 is a portion 90 in which stud bolt 91 is threadably secured. On stud bolt 91 is pivotally mounted a swinging member 92 which is forked at both ends and has pins 93 and 94 projecting inwardly into groove 55, and at the other end thereof pins 96 and 97 project inwardly into groove 81.

Fixedly secured to the end portions of member 92 is a Y-shaped member 100 which has prongs 101 and 102 connected respectively to the ends of member 92. The leg portion of member 100 has an elongated slot 103 therein in which is loosely mounted a bolt 104 which bolt is fixedly secured on a sliding rod 105 which rod is slidably mounted in the sidewalls of housing 46. This rod has its two ends designated by reference characters 106 and 107 respectively. Fixedly secured to the inner portion of housing 46 is a leaf spring 108 which has cavities 109 and 110 therein with a raised portion 111 intermediate the cavities 109 and 110.

On the other side of housing 46 from the position occupied by the wheels 57 and 83, is secured a stud bolt 115 on which is pivotally and loosely mounted a swinging member 116, and in the ends of member 116 are fixedly secured bolts 117 and 118 respectively, and on these bolts are loosely and rotatably mounted grooved wheels 119 and 120. It is noted that space is provided for lateral play of these wheels to compensate for any irregularities in the distance between the tracks 15 and 16. The wheels 119 and 120 are adapted to follow track 15.

The housing 46 has a bottom plate 46a which is fastened thereto by means of the bolts which pass through holes 47a in housing 46, thus forming an enclosure and permitting the parts in housing 46 to operate in a bath of lubricant.

Bolt 104 has a roller 104a thereon which follows leaf spring 108.

On the upper end of motor housing 45 is secured an end plate member of motor housing which is indicated by reference character 125, this being secured to housing 45 by any suitable means such as stud bolts 126.

Motor shaft 78 projects upwardly through this portion 125 and after passing through bearing portion 127, integral with portion 125, has fixedly secured thereon a fan or other air blast producing means indicated by reference character 128. This fan has a plurality of blades 128a, 128b and 128c; though it is evident that any number of blades may be used.

Fixedly secured to portion 125 is a fan box 130 having a bottom portion 131 and a circular sidewall portion 132 with a covering 133 having an opening 134 therein to admit air to the fan, and if desired this cover may be dispensed with or a different form of opening may be provided.

The bottom portion of fan box is secured to member 125 by any suitable means such as screws 135, and on opposite sides of the bottom portion 131, suitable openings 136 and 137 are provided to allow air to pass through the bottom 131, and suitably shaped vanes 139 and 140 are secured to the sidewall portion 132 of the fan box 130 and flare slightly outwardly, and after following the contour of the fan box sidewall for some distance, these vanes curve inwardly and backwardly to form a deflecting vane for an air blast passing through the holes 136 and 137. These inwardly and backwardly curving portions are indicated by reference characters 141 and 142.

It is evident that any suitable form of vane or deflecting member may be employed, and the invention is not limited to the specific vanes shown, but any suitable vanes may be used as will fall within the scope of the hereto annexed claims.

A disk fan, as is well known, produces blasts of air which travel in a spiral, corkscrew-like direction. This causes the blasts passing through the apertures to strike portions of the machine on inwardly travelling or outwardly travelling glancing directions depending on the point where the blast strikes the machine. This results in the blasts sweeping the portions of the machine inwardly and outwardly to more effectively clean the machine than if the blasts struck the machine while travelling in a straight line.

Figure 9:
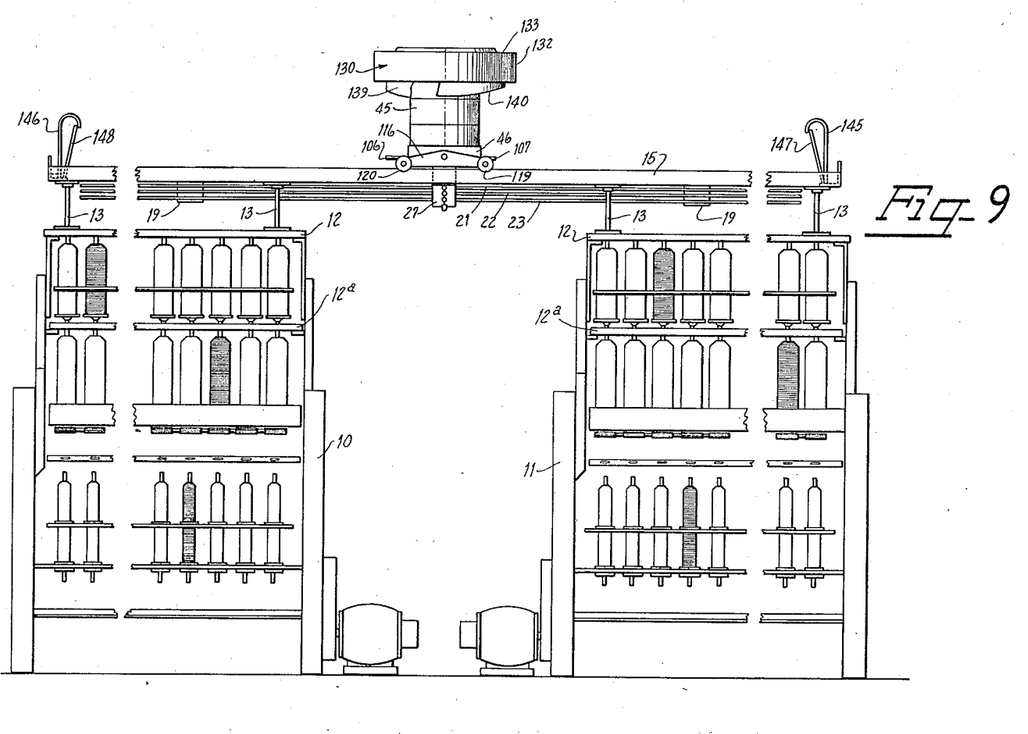
Figure 9 is a side elevation of portions of the two spinning frames showing the invention as applied thereto.

At each end of the trackway, regardless of length, upstanding members 145 and 146 are provided which are curved inwardly and downwardly at their upper ends, and resilient members 147 and 148 respectively are confined within these hooked portions of each of members 145 and 146. The purpose of this arrangement is such that when end 106 of rod 105 as shown in Figure 9, engages spring 148, it will press the spring backwardly until the resistance offered is enough to slide the rod 105 and to reverse the direction of travel of the mechanism on the trackway, and when the device reaches the other end of its travel, the members 145 and 147 will likewise operate to reverse the direction of travel.

Figure 10:
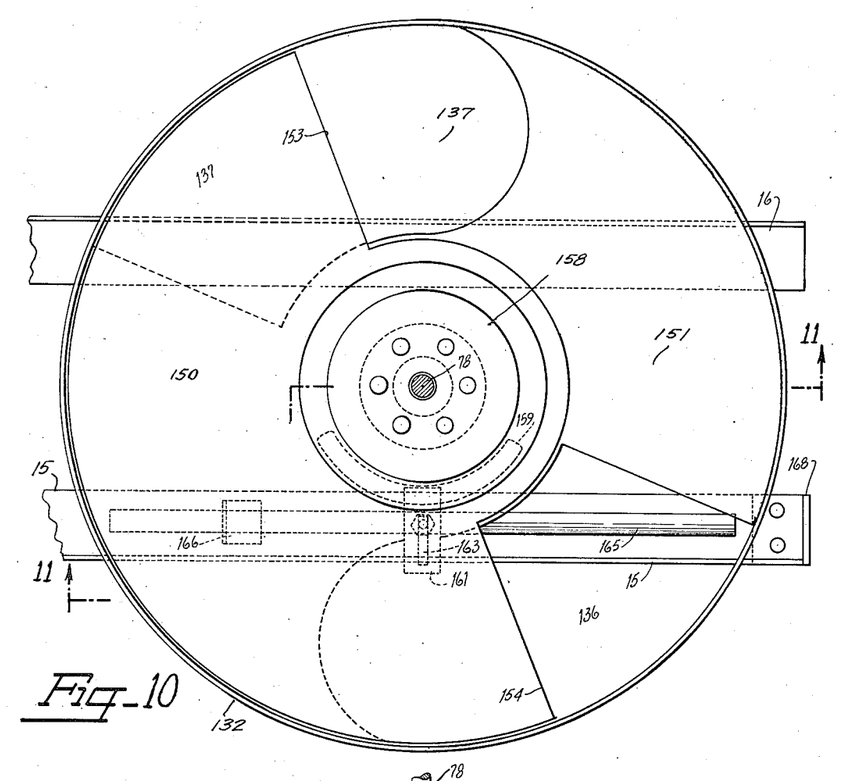
Figure 10 is a plan view of a modified form of the fan housing.
Figure 11:
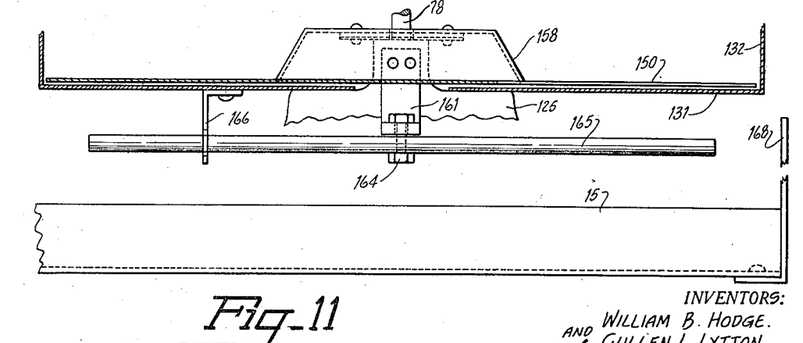
Figure 11 is a sectional view along line 11—11 in Figure 10.

In Figures 10 and 11 there is shown a modified form of the device by means of which air can be directed against one side of the machine as the mechanism travels in one direction along the track, and when a reversal of direction occurs, the air will be directed against the other side of the machine on the return movement of the mechanism.

In this modified form, there is loosely mounted around the motor shaft a plate 150 which plate has an opening 151, the opening 151 extending from point 153 to point 154, and in the position shown in Figure 10 the plate is in a position to half way close both of the openings 136 and 137. This, however, is shown for illustration purposes only, as plate 150 will, in operation, cover one opening in fan box and leave the other opening uncovered. This member 150 has a truncated conical central portion 158 which fits around the motor shaft 78, and in this form of the invention an arcuate slot 159 is provided in bottom 131 of the fan box in which an L-shaped lug 161 is adapted to have movement. This lug 161 is fixedly secured on the inside of truncated conical portion 158 and projects downwardly and outwardly and has an elongated slot 163 therein in which a bolt 164 is adapted to have movement, said bolt 164 being fixedly secured to sliding rod 165, which rod is slidably mounted in a guide 166.

At each end of the track, a suitable abutment 168 is provided so that when the mechanism has moved to one end of the track the rod 165 will be moved in the same manner as rod 105 by striking against the abutment 168, and the plate 150 will be moved to close one of the holes in the bottom of the fan box and open the other, and then when it reaches the other end of the track, a reverse movement will occur to open the opposite hole and close the one which was open while the mechanism was traveling in the other direction.

Figure 5:
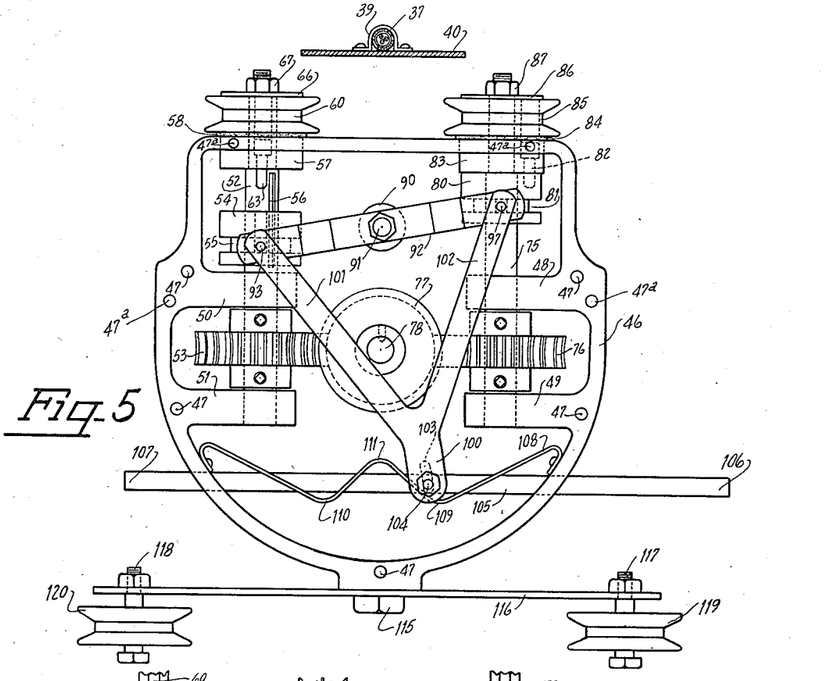
Figure 5 is a bottom plan view of the device taken along the line 5—5 in Figure 1 with the trackway omitted.
Figure 12:
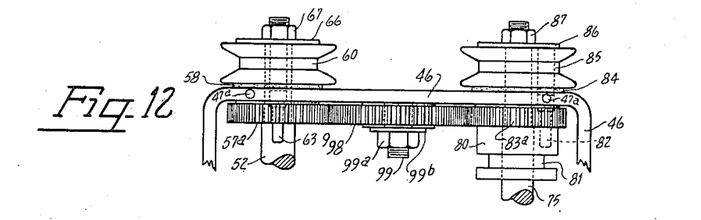
Figure 12 is a view of the upper portion of Figure 5 with the addition of means for causing both wheels to be positively driven.

In Figure 12 a fragmentary view is shown which is identical to the upper portion of Figure 5 except for certain additions thereto, and the parts which are in Figure 5 are referred to in Figure 12 by the same reference characters. In Figure 5, only one of the wheels 60 or 85, as the case may be, is positively driven at a time, and in Figure 12, means are provided whereby in both directions of travel along the track both wheels will be positively driven, and this is accomplished by having portion 57a in the form of a spur gear instead of in the form shown at reference character 57 in Figure 5, and likewise, portion 83 in Figure 5 is in the form of a spur gear 83a in Figure 12.

Between these spur gears an idler gear 98 is provided which meshes with both spur gears 57a and 83a. Idler gear 98 is rotatably mounted on an enlarged bearing portion of a bolt 99 which is secured in any suitable manner to the inside of housing 46, and a washer 99b is held against the enlarged portion of bolt 99 by means of nut 99a. It is, therefore, seen that when either of the wheels 60 or 85 is positively driven that the other wheel will also be positively driven in the same direction by means of the idler gear between the wheels. This positive driving of both wheels gives greater traction than the arrangement shown in Figure 5 and, therefore, eliminates any possibility of grease, oil and the like on the track interfering with the travel of the traveler.

It might be noted that the traveler includes all of the structure supported for travel along the track including the motor and the housing 46 in the lower end thereof and the fan box and associated parts at the upper end of the motor housing.

Figure 1:
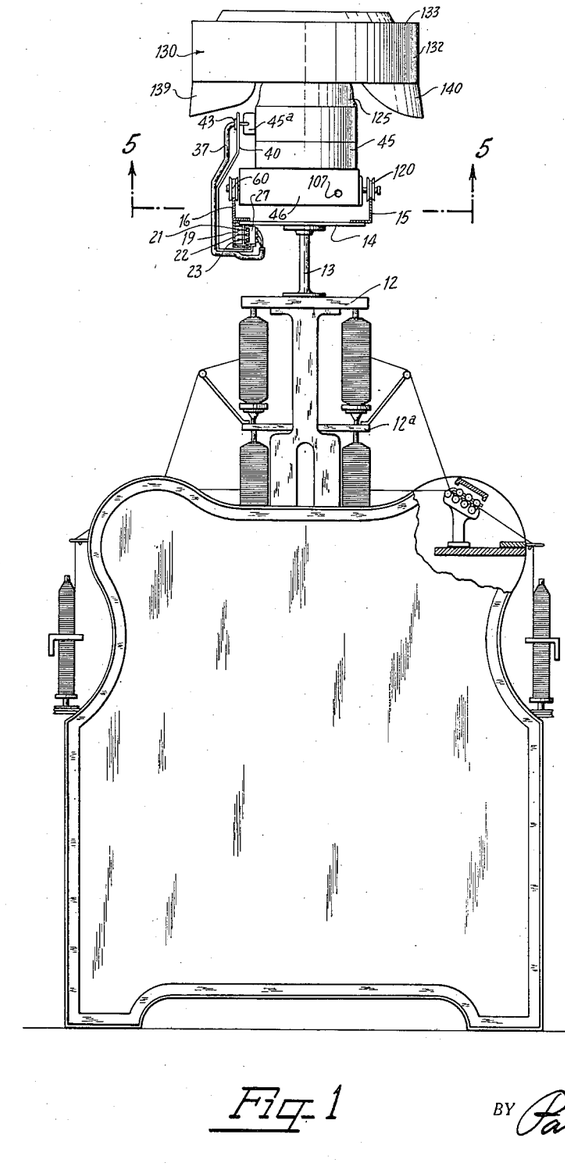
Figure 1 is an end elevation of a spinning frame showing the invention attached thereto, but omitting the abutment for operating the reversing mechanism.
Figure 2:
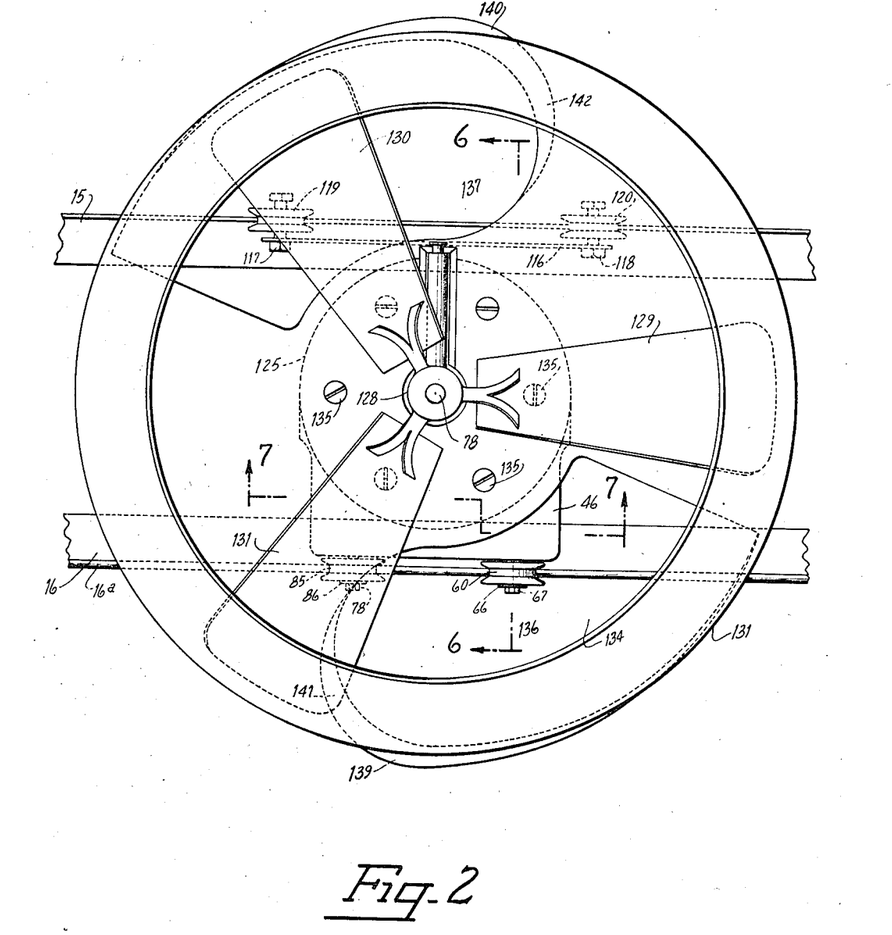
Figure 2 is a plan view of the mechanism as shown in Figure 1, omitting the spinning frames.
Figure 3:
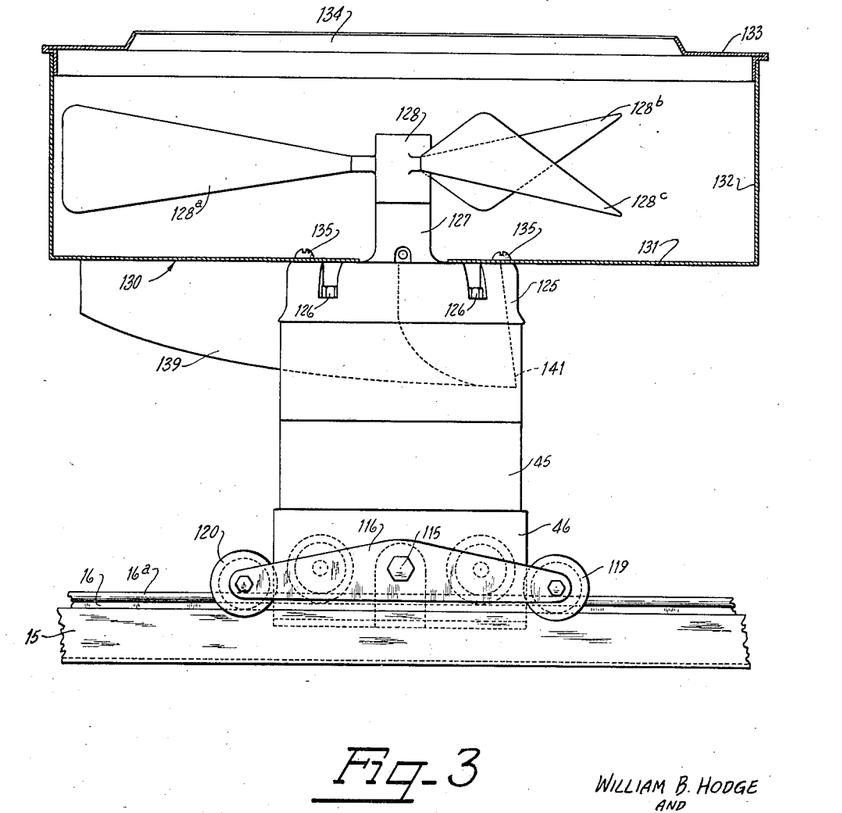
Figure 3 is a side elevation with the upper portion of the housing for the fan shown in cross section, looking downward in Figure 2.
Figure 4:
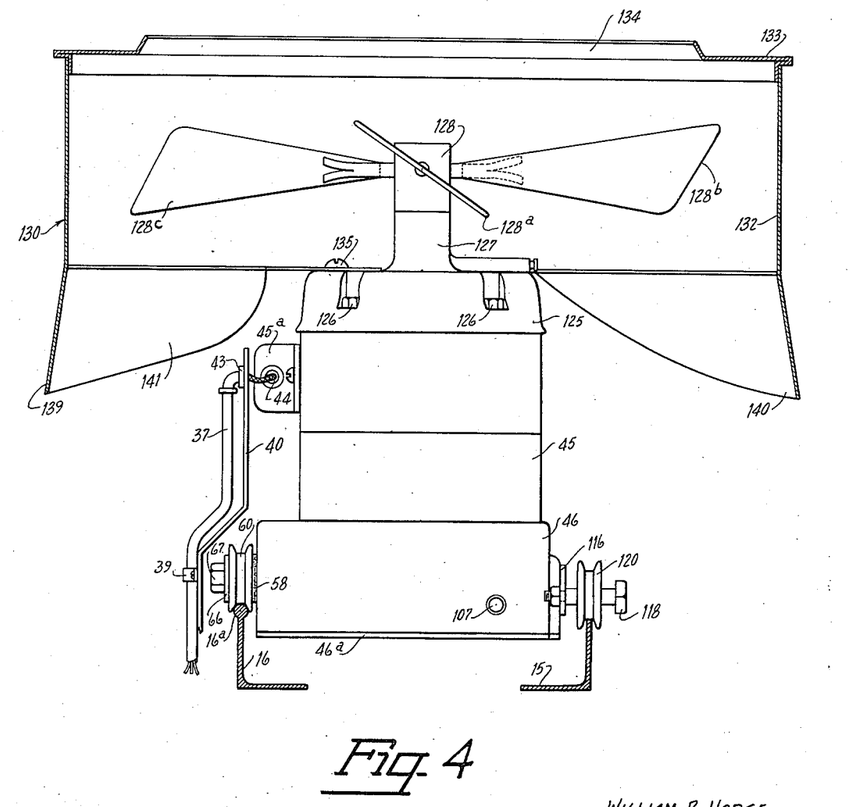
Figure 4 is an end elevation with the upper portion shown in cross section.
Figure 13:
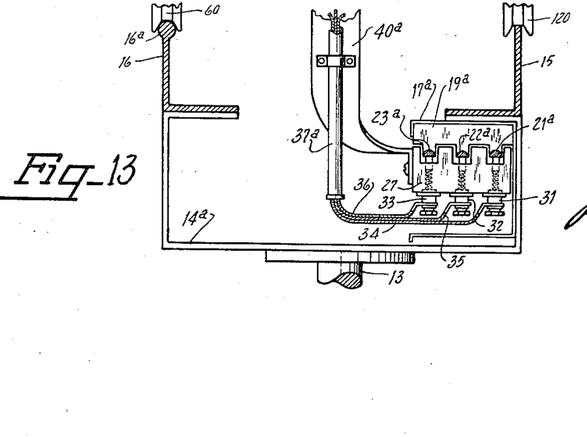
Figure 13 shows a modified form of trolley and support for the track.

In Figure 13 there is shown a modified form of the manner in which the trolleys are mounted. In this figure like reference characters are used to indicate corresponding parts in Figures 6 and 8, but it is noted that cross bar 14a is different from that shown in Figure 1 so as to allow travel of bracket 40a supporting brush holding member 27. The brush holding member 27 and the contract points and the wires leading therefrom have like reference characters to Figure 6 for the reason that the structure is the same, but the trolleys are shown of a semi-circular formation and indicated by reference characters 21a, 22a and 23a and are supported by spaced insulating blocks 19a within a sheet metal housing 17a extending beneath the track 15.

Figures 6, 8:
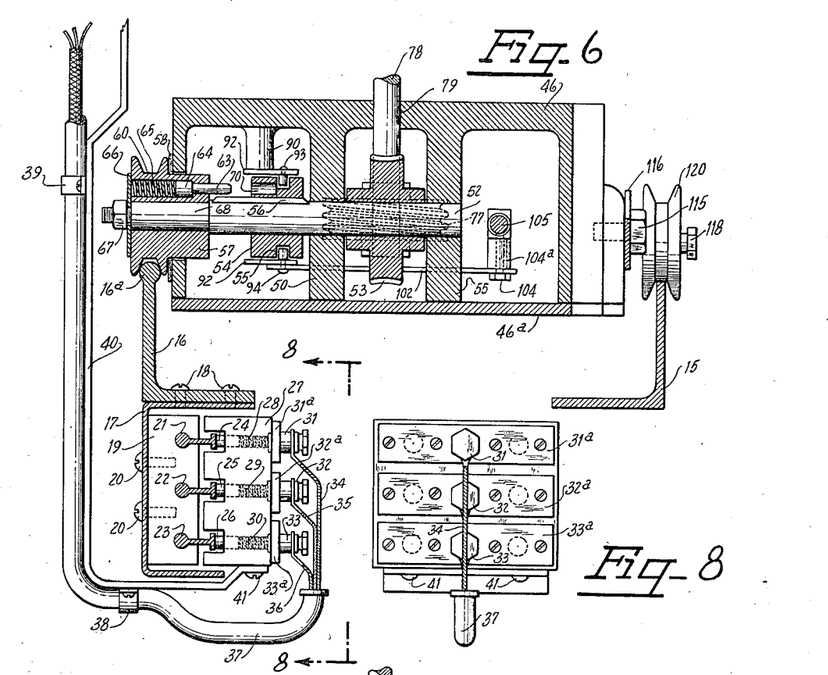
Figure 6 is a cross sectional view taken through the housing 46 along the line 6—6 in Figures 2 and 3.
Figure 8 is a view looking from along the line 8—8 in Figure 6.
Figure 7:
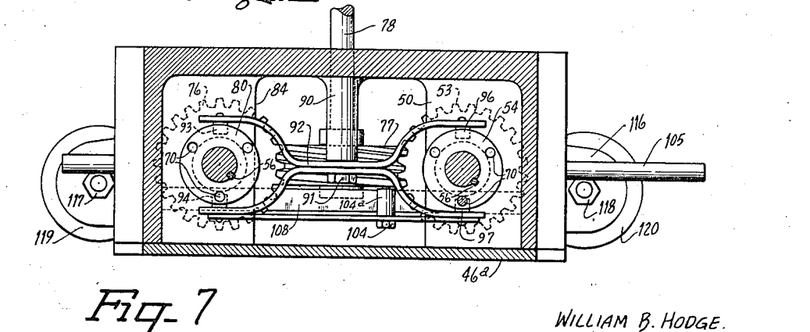
Figure 7 is a cross sectional view taken through the housing 46 along the line 7—7 in Figure 2.

The advantage of this arrangement is that housing 17a properly guards the trolleys, whereas, in Figure 6, it might be necessary on account of the requirements of insurance companies, to place a separate guard over the trolleys and member 27 to properly shield the same.

In the drawings and specification there has been set forth a preferred embodiment of the invention, and although specific terms are employed, they are used in a generic and descriptive sense only, and not for purposes of limitation, the scope of the invention being set forth in the appended claims.

We claim:

1. Apparatus for cleaning machines comprising a superimposed track mounted above the machines, a motor driven carriage including a disc fan rotating upon a substantially vertical axis and mounted for travel back and forth along said track, a housing surrounding said fan independently of said motor and having a plurality of separated air outlets in the base thereof and means co-operating with said several outlets for directing downwardly the several blasts escaping therefrom in respectively different directions.

2. Apparatus for cleaning machines, comprising a track mounted above the machines, a motor, a disc fan driven by the motor and rotatable about a substantially vertical axis, mounted for travel back and forth along said track, a box surrounding the fan but excluding the motor and having a pair of apertures in the bottom thereof through which a plurality of air blasts from said fan may pass, means associated with said apertures for directing air blasts therefrom longitudinally of the machines in divergent directions from a transverse axis.

3. Means for cleaning machinery comprising a motor, a horizontal disk fan driven by the motor, a traveler mounted on a track secured above the machinery for supporting the motor and being adapted to travel back and forth above the machinery, a box surrounding said fan but excluding the motor, said box having a bottom provided with a pair of apertures therein through which swirling air blasts from the fan may pass, means associated with said apertures for directing air blasts therefrom longitudinally of the machine in divergent directions from a transverse axis.

4. Apparatus for removing lint and other particles from textile machinery, comprising a track mounted above the machinery, a motor driven substantially horizontal disc fan mounted to travel back and forth along said track, a box surrounding said fan and having a plurality of apertures therein, and means for closing some of said apertures while the fan is traveling in one direction.

5. Apparatus for cleaning machinery comprising a motor driven horizontal disc fan, a plurality of track members mounted above the machinery and forming a trackway for said fan, means for moving said fan back and forth along said trackway, a box surrounding said fan and having an apertured bottom and a vane secured to said bottom for directing the air blast from said apertured bottom against the machinery.

6. Cleaning apparatus for machinery including a trackway comprising parallel rails, means for securing the trackway above the machinery, a motor-driven horizontal disc fan mounted for travel back and forth on and above the trackway, means driven by the motor for moving the fan on said trackway, a housing surrounding said fan and having an air inlet and air outlets and cooperating air guiding means adjoining said outlets for directing the several air blasts escaping therefrom in divergent downward directions past the trackway and against the machinery.

7. Cleaning apparatus for machinery comprising a trackway formed of a plurality of tracks, means for securing the trackway above and to the machinery, a motor driven horizontal disc fan mounted on the trackway to travel back and forth thereon, a box surrounding said motor driven fan, said box having apertures therein for permitting ingress and egress of air and a vane partially surrounding each of said apertures for directing the egress of air from said box against the machinery.

8. Apparatus for cleaning machinery comprising a trackway mounted on the machinery, a motor driven horizontal disc fan mounted for travel back and forth along said trackway, a box surrounding said fan, said box having a bottom provided with a plurality of apertures therein and a vane partially surrounding each of said apertures for directing air issuing from said apertures in divergent different directions upon said machinery.

9. Means for cleaning lint and other foreign particles from machinery comprising a track mounted above the machinery, a wheeled framework adapted to travel along said track, a motor-driven disc fan supported on the framework and having connections with the wheels thereon for producing swirling air blasts and co-operating air guiding means associated with the fan for directing the swirling blasts in a predetermined downward direction.

10. Means for cleaning machinery by an air blast which comprises a track mounted on the machinery and located above the machinery, a wheeled framework mounted on said track, an electric motor supported by said framework, a geared connection between the said motor and the wheels of said framework, reversing means for reversing the direction of travel of said framework, a disk fan propelled by said motor and having a box therearound, said box having a plurality of apertures in the bottom thereof and a vane partially surrounding each of said apertures for directing a downwardly swirling blast of air from said box against the machinery.

11. Cleaning mechanism for machines comprising a track secured to said machines and being disposed above said machines, an electric motor having a vertically disposed motor shaft and having a fan secured to the upper end of said motor shaft, two transversely disposed oppositely driven axles associated with the lower end of said motor shaft and having a geared connection with said motor shaft, each of said axles having a wheel loosely mounted on an end thereof, slidable means non-rotatably mounted on said axles for engaging, one at a time, the wheel on the end of each of said axles for driving the motor and fan along the track in one direction, and abutment members mounted at each end of the track for engaging and moving said slidable means for reversing the direction of travel of said fan and motor.

12. Means for cleaning machinery of foreign particles comprising a track mounted above the machinery, an electric motor, a housing secured to the lower end of said electric motor, a vertically disposed shaft in said electric motor, a fan on the upper end of said shaft, a box surrounding said fan, means for directing air from said box against the machinery, two transversely disposed oppositely driven axles in said housing, a wheel loosely mounted on one end of each of said axles and adapted to rest on the track, means for selectively connecting one of said wheels at a time with said motor shaft for reversing direction of travel of said mechanism when it reaches the end of the track.

13. Apparatus of the class described comprising a track mounted above a machine, a wheeled housing mounted on said track, a motor having a vertically disposed motor shaft secured to the upper side of said housing, two transversely disposed oppositely driven rotatable shafts mounted in said housing and having one end thereof projecting from the housing, a wheel loosely mounted on an end of each of said shafts and projecting into the housing, a geared connection between the motor shaft and said transversely disposed shafts, collars slidably mounted on said shafts and being adapted to rotate therewith, means for alternately connecting said collars to said wheels, means at each end of the track for operating said means for alternate connection, a fan mounted on the upper end of said motor shaft, means enclosing said fan and having means for directing the air from said fan against said machine.

14. Cleaning apparatus comprising a track disposed above a machine, a motor having a vertically disposed shaft, a housing secured to the lower end of said motor, two transversely disposed shafts mounted in said housing and having a geared connection with said shafts, a wheel on each of said shafts adapted to follow said track, other wheels mounted on said housing and being adapted to follow said track, means for alternately connecting said first wheels to said motor shaft to impart rotation to said wheels, means at each end of the track for operating said alternate connecting means, a fan on the upper end of said motor shaft, a box for said fan, means for directing air from said box and fan against the machine, and means for supplying electric energy to said motor as it travels along the track.

15. An apparatus of the class described comprising a track mounted above a machine, a motor mounted on said track to travel back and forth thereon, said motor having a vertical shaft, means for supplying electric current to the motor as it travels, means for reversing the direction of travel of the motor, a horizontal disc fan mounted on the upper end of said motor shaft, a box surrounding said fan but excluding the motor, said box having a plurality of apertures in the bottom thereof through which air from the fan may pass and guiding vanes at the outlets of said apertures for directing the air after it passes thru said apertures.

16. Apparatus for cleaning machines comprising a track mounted above the machines, a motor mounted for travel back and forth on the track, said motor having a vertically disposed shaft, connections with said shaft for propelling the motor along the track, means for reversing the direction of travel of the motor at each end of the track, a fan mounted on the upper end of the motor shaft, a box enclosing said fan and having a plurality of apertures in the bottom thereof and vanes around a portion of said apertures for directing an air blast issuing from said apertures.

17. Apparatus for cleaning machines comprising a self-propelled traveler, including a disc fan carried thereby for producing swirling air blasts, an open topped housing surrounding said fan and provided with a plurality of openings in the base thereof, means cooperating with the openings for directing said blasts downwardly and divergently upon different parts of the machines.

18. Apparatus for cleaning machines comprising a self-propelled traveler carrying a disc fan having an open topped housing surrounding the same and provided with a plurality of openings in the base thereof, means co-operating with said openings to direct the several blasts of air escaping downwardly through the openings independently of each other upon different parts of the machines, the propelling means for the traveler including a motor mounted outside of said housing.

19. Apparatus for cleaning machines, comprising a traveler, an enclosed disk fan carried thereby and having means for producing and directing separate diverging swirling blasts of air upon the outer parts of the machines on either side and upon and across the central surfaces of the machines in separate courses and opposite directions with respect to each other.

20. Apparatus for cleaning machines, comprising a traveler, an enclosed disk fan carried thereby and having means for directing separate diverging swirling blasts of air upon the outer parts of the machines on either side and upon and across the central surfaces of the machines and on the material carried thereon from opposite sides and in separate courses with respect to each other.

21. Apparatus for cleaning ring spinning machines and the like, comprising a traveler moving on a track mounted lengthwise of and centrally over the machines, a disk fan carried by the traveler and having a box surrounding the same, said box having a bottom provided with a plurality of openings for directing separate swirling blasts of air downwardly on opposite sides of said machines, and for causing a portion of each blast to sweep over the outer portions of the machines, and other portions of said blasts to sweep inwardly across the central portions of the machines and outward on the further side thereof, in separate courses and from opposite sides with respect to each other.

22. Apparatus for cleaning ring spinning machines and the like, comprising a traveler movable longitudinally of said machines, a disk fan carried by the traveler and having a box surrounding the same, said box having a bottom provided with a plurality of openings for directing separate swirling blasts of air toward the spindles on either side of the machines, and for causing a portion of each blast to sweep inwardly across the central portion of the machines, and another portion of each blast to flow outwardly away from the machines, means for reciprocating said traveler longitudinally and centrally of said machines, means operable to cause the portions of the blasts which sweep across the machines to impinge upon central portions of the machines and of the material in process thereon in succession and in opposite directions.

23. Apparatus for removing lint and other foreign matter from textile machinery, comprising a track mounted on the top portion of the machinery, a substantially horizontal motor-driven disc fan surmounting said track and arranged for self-propelled travel back and forth thereon, an open topped housing enclosing said fan independently of said motor and having a plurality of air outlets in the base thereof.

24. Means for removing lint and the like from a machine which comprises a trackway disposed above the machine, a traveler mounted for travel on said trackway, said traveler having blast producing means disposed above the trackway and extending laterally beyond the trackway for producing and directing blasts of air laterally of the trackway and downwardly onto said trackway and onto said machine.

25. Means for removing lint and the like from a machine comprising a trackway disposed above the machine, a wheeled frame work adapted to travel on said trackway, a positively driven disk fan in said framework, said fan having a vertically disposed axis, a box surrounding said fan and having a pair of apertures in the bottom thereof and extending to the outer edge thereof, the width of said bottom being greater than the width of the trackway whereby blasts issuing from said apertures may strike the trackway and the machine.

26. Means for removing foreign loose particles from a machine comprising a positively driven disk fan disposed on a vertical axis with relation to the machine and mounted for travel back and forth along the top of the machine, a trackway for supporting said fan, a box surrounding said fan, said box having an open upper end and a bottom member therein, said bottom member having apertures therein laterally disposed with relation to the trackway and the portion of each aperture farthest removed from the track being provided with a vane surrounding less than the whole perimeter of said aperture for directing blasts of air issuing from said fan downwardly onto said trackway and onto said machine.

27. Means for removing foreign loose particles from a machine comprising a trackway disposed above the machine, a wheeled framework mounted for travel on said trackway, a fan mounted in said framework, a motor on the framework for driving the fan, a box surrounding said fan but excluding the motor and having a pair of apertures therein laterally disposed with relation to the trackway whereby some of the air from the fan can pass directly onto portions of the machine, and vanes surrounding less than the whole of the perimeter of said apertures for directing a portion of air from said fan onto other portions of said machine.

28. Means for removing lint and other particles from machinery comprising a track mounted above the longitudinal center of the machinery, a framework having wheels thereon adapted to travel on the track, an electric motor having a vertically disposed shaft and being supported by said framework, a disk fan mounted on the upper end of said motor shaft, a geared connection between the motor shaft and said wheels, a box surrounding said fan and excluding the motor and having an open upper end and a bottom member in its lower end, said bottom having a pair of apertures therein laterally disposed with relation to the track and a vane associated with the edge of each aperture farthest removed from the track for directing blasts of air created by the fan downwardly and inwardly towards portions of said machinery.

29. Means for supporting and driving a fan for cleaning a machine comprising a plurality of supports extending upward from the machine and having a pair of spaced members mounted on the upper ends thereof to form a trackway lengthwise of said machine, a wheeled carriage for said fan disposed above the trackway and having its wheels in tractive engagement with said trackway, a motor disposed above and supported by said carriage for propelling said carriage, a fan driven by said motor, a plurality of electric conducting members supported by the trackway and insulated therefrom, and a plurality of contacts carried by the motor and engaging said conducting members.

30. Means for removing lint and other foreign particles from textile machinery comprising a trackway extending longitudinally of the machinery, a wheeled framework mounted on top of the trackway, an electric motor mounted on and disposed above the wheeled framework, driving connections between the motor and the wheels of said framework, blast producing means driven by the motor, means surrounding the blast producing means and extending downwardly for directing the blasts from the blast producing means past each side of the trackway and onto the machinery.

31. Means for removing lint and other foreign particles from textile machinery comprising a trackway extending longitudinally of the machinery, a wheeled framework mounted for travel on top of the trackway, an electric motor mounted on top of the wheeled framework, blast producing means driven by the motor, guiding means co-operating with said blast producing means for directing the air blasts from said blast producing means downwardly past both sides of the trackway and onto the machine.

32. Means for supporting and driving a fan for cleaning a machine comprising a trackway having a pair of spaced members extending lengthwise of said machine, a wheeled carriage for said fan disposed above said trackway and having its wheels in tractive engagement with said trackway, a motor disposed above said trackway and supported by said carriage for propelling said carriage, blast-producing means driven by the motor, a plurality of electric conducting members supported by the trackway and insulated therefrom, a plurality of contacts electrically connected with said motor carried by the wheeled carriage and engaging said conducting members, and means for directing the blasts from said blast-producing means on to the machine.

33. Means for removing lint and the like from machinery which comprises a trackway located at a higher level than the top of the machinery and extending longitudinally thereof, a wheeled framework mounted for travel on top of said trackway, an electric motor mounted on the wheeled framework and disposed above said trackway, driving connections between the motor and wheels of said framework, blast-producing means driven by the motor, means surrounding the blast-producing means and blast-directing means extending therefrom beyond said trackway for diverting the blasts from said blast-producing means downwardly past the side of the trackway and on to the machinery.

WILLIAM B. HODGE.
CULLEN L. LYTTON.